UNITED STATES PATENT OFFICE.

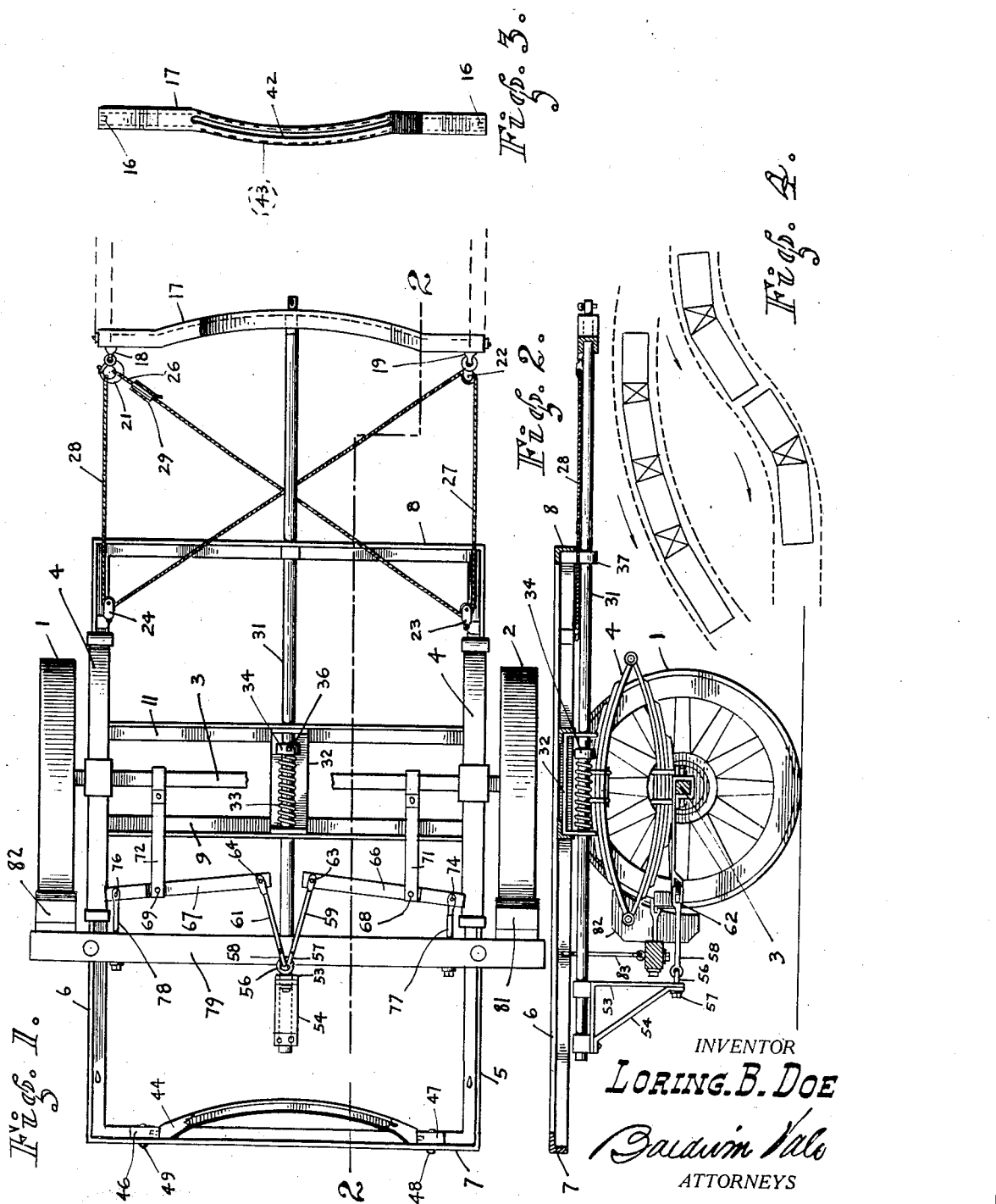

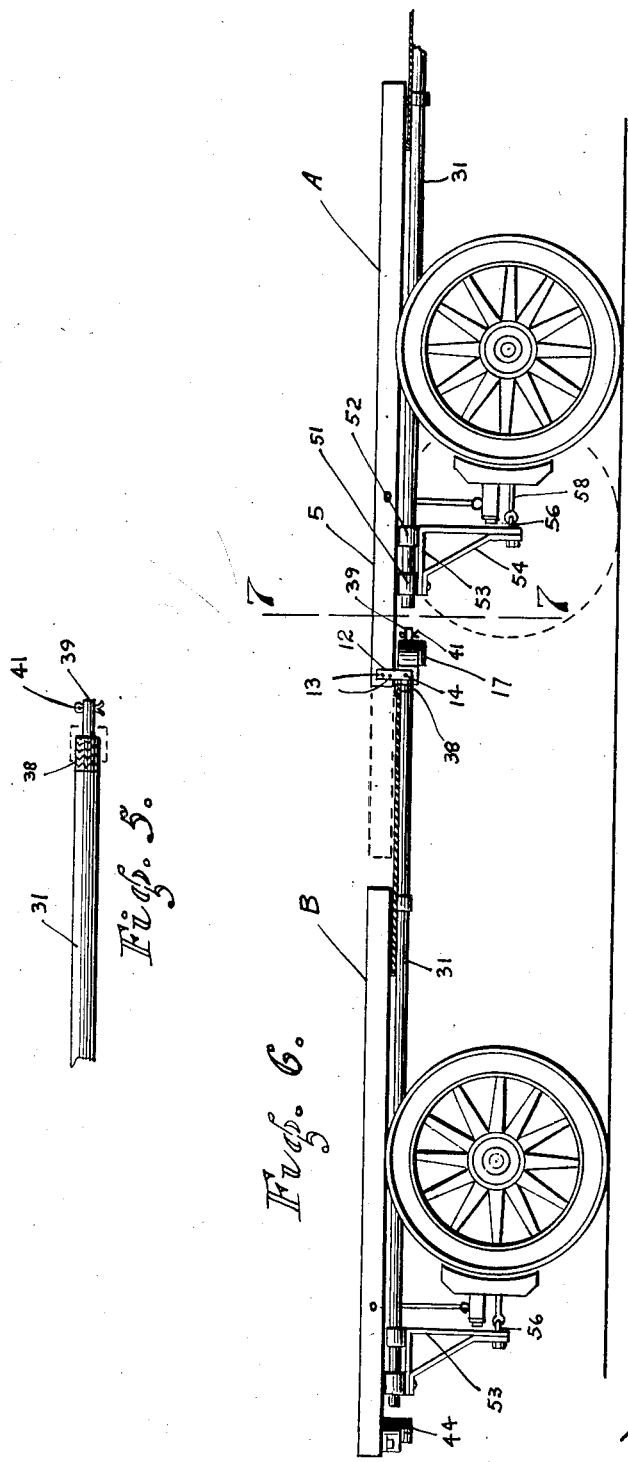

LORING B. DOE, OF SAN FRANCISCO, CALIFORNIA.

TRAILER.

1,331,421.     Specification of Letters Patent.     Patented Feb. 17, 1920.

Application filed November 1, 1918. Serial No. 260,719.

*To all whom it may concern:*

Be it known that I, LORING B. DOE, a citizen of the United States, and a resident of the city and county of San Francisco, State of California, have made a new and useful Invention—to wit, Trailers; and I do hereby declare the following to be a clear, full, concise, and exact description of the same.

This invention is an improved trailer having novel features in its construction, which render it adaptable to many commercial uses where it is desirable to tow a trailer behind a driven vehicle.

Among the objects of the invention is to provide a trailer of such construction that the supporting wheels will track with those of the lead vehicle or pulling unit and, by thus describing the same course over a roadway, relieve the pulling vehicle of lateral strains due to side sway of the trailer, and to obviate the necessity for the driver of the pulling unit dividing his attention to watch the trailer.

Another object of the invention is to provide means whereby the trailers may be used in trains and a plurality of said trailers may be towed over a given course with no more difficulty in steering than would be encountered by the pulling unit alone over said course.

A further object is to provide means whereby each trailer while under way will automatically apply brakes to the vehicle in response to a sudden decline or inequality in the roadway.

Other objects will appear as the description proceeds.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the accompanying two sheets of drawings:—

Figure 1 is a bottom plan view of my improved trailer showing a novel draft hitch and brake installed thereon, Fig. 2 is a section on the line 2—2 of Fig. 1, Fig. 3 is a side view of a pull bar, Fig. 4 is a diagrammatic plan view showing the operation of the compensating hitch while traveling around curves, Fig. 5 is a fragmentary view of a reach pole showing a roller bearing thereon, Fig. 6 is a side elevation of two trailers hitched together showing the manner of attachment when the trailers are used in trains, Fig. 7 is a cross section of a trailer frame on the lines 7—7 of Fig. 6 looking in the direction of the arrow, Fig. 8 is a plan view of same, and Fig. 9 is a view taken on the line 9—9 of Fig. 8, looking in the direction of the arrow.

Referring to the two sheets of drawings, wherein like numerals refer to like parts, the numerals 1 and 2 indicate the wheels of a two wheeled trailer suitably journaled on an axle 3, to which are fixed springs 4—4.

The frame of the trailer is fabricated of angle iron and comprises the sill bars 5 and 6 and the end bars 7 and 8, which are suitably joined at the corners and provided with lateral braces 9 and 11 secured at their ends to the sills 5 and 6.

In Fig. 6, I have shown two trailers A and B, A being the lead vehicle and hereinafter called "the tractor". The towing vehicle A or tractor is provided at either side and near the rear of the frame with depending strips 12 secured to the members 5 and 6 of the frame as shown at 13. Extending through the lower portion of each of the strips 12 are pivot pins 14 journaled in holes 16 in opposite ends of a pull bar 17.

The pull bar 17 is pivotally swung beneath the rear of the frame of the tractor and being pivoted loosely on the pins 14 provides a vertically oscillative coupling. The opposite ends of the pull bar 17 are provided with eye-bolts 18 and 19 which respectively receive the snap hook 21 and the snatch block 22 which are provided with rings for engaging said eye-bolts.

The forward opposite corners of the forward end of the trailer are provided with pulleys 23 and 24. The draft coupling between the tractor and trailer comprises a flexible connection, preferably a cable, having one end 26 engaging the hook 21 and passing obliquely rearward and reeved through the pulley 23, thence forward at 27 and reeved through the block 22, thence obliquely rearward and reeved through the pulley 24, thence forward and having its other end 28 attached to the hook 21. The cable is provided with a clamp 29 of conventional form for adjustment.

The oblique portions of the cable cross in the center of the line of draft which is the longitudinal line through the center of the trailer intermediate between the sides thereof.

Located in said line of draft and extending through a greater portion of the length of the frame of the trailer is a slidably guided reach pole 31. The reach pole 31 is journaled in a U-plate 32 which is suitably secured to the angle iron braces 9 and 11. Surrounding the reach pole 31 and extending for a distance between the depending members of the U-plate 32 is a buffer spring 33 bearing at the end adjacent the rear of the trailer against one of the said depending members of the U-plate 32, and at the opposite end against a collar 34 secured to the reach pole 31 by a set screw 36. The reach pole 31 is also journaled in a bearing 37 secured to the forward member 8 of the frame.

The reach pole 31 is provided at its forward end with a roller bearing 38 of conventional type, and the said reach pole is provided with a reduced portion 39 through a hole in which extends a cotter pin 41.

It is to be understood in the description hereinafter given that the reach pole is in no sense a draft pole, and is not used to guide the trailer over the course taken by the tractor. It horizontally stabilizes the trailer, and also acts as operating means for a brake mechanism hereinafter described.

In order to facilitate the steering of the trailer, the reduced portion 39 of the reach pole 31 extends through a slot 42 in the pull bar 17, wherein it is radially guided by said slot.

The pull bar 17 is U-shaped in central cross section, and when the trailer and tractor are hitched, as shown in Fig. 6, the reduced portion 39 on said pole extends through the slot 42 of the bar 17, and the roller bearing rotates on the reduced portion 43 of the said pull bar. The bar 17, for a considerable portion of its length in both directions from its central point, is curved on a horizontal plane in an arc struck from a point on the axle 3 midway between the wheels 1 and 2. The purpose of this curve on the horizontal plane is to provide for the lateral or radial movement of the reach pole 31 as the trailer follows the tractor over the curved course.

In order that the reach pole 31 may normally rest in its true central position, and will readily return to said position, the bar 17 is also arcuate on the vertical plane, as shown in Fig. 3.

It will be seen from this description that, as the trailer follows the tractor over an uneven road surface and describes a circuitous course, any possible motion of the reach pole 31 will be accommodated by guidance in all directions by the bar 17 because of its doubly arcuate shape, and its pivoted relation to the plates 13 from which it is suspended.

Each trailer is provided beneath the rear of its frame with a similar pull bar 44 which is journaled in bearings 46, 47, bolted as shown at 48, 49 to the member 7 of the frame. The bar 44 is substantially a fifth wheel arrangement and has the same vertical and horizontal arcuate form as the bar 17 for the same purpose, the only point of difference being that it is suspended from bearings 46, 47 within the angle iron 7.

It will be seen from the preceding description that, when the said collar 34 is secured in that position shown in Figs. 1 and 2 to the reach pole 31, the said reach pole is slidable longitudinally in the entire frame of the trailer, the spring 33 acting as a buffer against sudden shock. In case of a sudden stop or decrease of speed by the tractor, the reach pole 31 will be pushed rearwardly or the entire trailer frame will advance on said reach pole 31 compressing the spring 33.

I have utilized this movement to apply a brake mechanism hereinafter described. The reach pole 31 is provided with collars 51, 52 which are removably secured to said pole. Secured to the under side of the collars 51, 52 is an angle bar 53 which is reinforced by an oblique bar 54. The lower end of the vertical members of said bars are provided with registering holes for a ring bolt 56 secured thereto by a nut 57. Engaging the ring bolt 56 are eyes 57, 58 on the ends of links 59 and 61. The opposite ends of said links are bifurcated as shown at 62 and pivoted as shown at 63, 64 to the ends of the levers 66 and 67. The levers 66 and 67 are fulcrumed at 68 and 69 on pivot pins in the ends of rods 71, 72 suitably secured at their opposite ends to the axle 3. The outer ends of the levers 66 and 67 are pivotally connected, as shown at 74 and 76, to link bolts 77 and 78 which extend through a brake beam 79 carrying brake shoes 81 and 82.

Having thus described my invention what I claim as new and desire to secure by Letters Patent of the United States is as follows:—

1. A trailer including a wheeled truck, a pivotal pull bar attachable to a tractor, a reach pole slidably guided in said truck abutting said pull bar and radially guided in a slot therein; braking means on said truck operated by said reach pole and said pull bar; a buffer spring interposed between said pole and said truck and compressible before the operation of said braking means against the wheels of said truck, when said truck moves forward on said pole; and a draft hitch between said tractor and said truck.

2. A trailer including a wheeled truck; pulling means comprising an arcuate beam pivotally connectible to a tractor and having an arcuate slot therein; a reach pole slidably guided on said truck and radially guided in said slot; and a draft hitch between said tractor and said truck.

3. In a trailer, the combination of a wheeled truck, a pivoted arcuate shaped pulling member mounted upon a tractor, a non-draft reach pole slidably and resiliently carried upon said truck, said reach pole having a reduced end portion, a slot within said arcuate shaped member and adapted to receive said reduced portion of said pole, a pin passing through said reduced portion extending through said slot and adapted to prevent withdrawal of the same, braking means carried by said truck, and operated through movement of said reach pole with relation to said truck, said movement being caused by contact of said reach pole upon the arcuate shaped portion of said abutment, a flexible frame compensating hitch between the ends of said pivoted pulling member and said tractor.

4. In a trailer, the combination of a wheeled truck, a pivoted arcuate shaped pull member mounted upon a tractor, a non-draft reach pole slidably and resiliently carried upon said truck, said reach pole having a reduced end portion, a slot within said arcuate shaped member and adapted to receive said reduced portion of said pole, a pin passing through said reduced portion extending through said slot and adapted to prevent withdrawal of the same, braking means carried by said truck, and operated through movement of said reach pole with relation to said truck, said movement being caused by contact of said reach pole upon the arcuate shaped portion of said pull member, a flexible connector extending from one end of said pull member diagonally to a sheave upon said tractor, forwardly to a sheave mounted upon the opposite end of said pull member, thence diagonally to a sheave mounted upon the opposite side of said tractor, thence forwardly to the point of commencement.

In testimony whereof, I have hereunto set my hand at San Francisco, California, this 16th day of September, 1918.

LORING B. DOE.